United States Patent [19]

Failes

[11] Patent Number: 4,707,201
[45] Date of Patent: Nov. 17, 1987

[54] METHOD OF PRODUCING POLISHED BLOCK TYPE, SINGLE MODE, EVANSCENT WAVE DIRECTIONAL COUPLERS BY MEANS OF MASS PRODUCTION OF THE COUPLER HALVES

[75] Inventor: Michael Failes, Moffat, Canada

[73] Assignee: Canadian Instrumentation and Research Limited, Burlington, Canada

[21] Appl. No.: 898,100

[22] Filed: Aug. 20, 1986

[51] Int. Cl.$^4$ ............................................. B65H 69/06
[52] U.S. Cl. ......................................... 156/64; 29/407; 29/445; 29/463; 29/559; 51/281 R; 51/326; 156/153; 156/158; 350/96.15; 350/320
[58] Field of Search ................. 29/559, 463, 445, 407; 350/96.15, 96.16, 96.17, 96.21, 96.30, 320; 156/153, 64, 160, 158, 228, 295; 51/284 R, 326, 281 R, 283 R

[56] References Cited

U.S. PATENT DOCUMENTS

| | | | |
|---|---|---|---|
| 4,009,540 | 3/1977 | Uijen .................................. | 51/283 R |
| 4,152,172 | 5/1979 | Jensen et al. ..................... | 51/326 X |
| 4,268,946 | 5/1981 | Eisenberg ...................... | 51/283 R X |
| 4,387,954 | 6/1983 | Beasley ............................. | 350/96.15 |
| 4,431,260 | 2/1984 | Palmer ............................. | 350/96.15 |
| 4,461,536 | 7/1984 | Shaw et al. ...................... | 350/96.15 |
| 4,469,397 | 9/1984 | Shaw et al. ...................... | 350/96.15 |
| 4,493,528 | 1/1985 | Shaw et al. ..................... | 156/153 X |
| 4,515,431 | 5/1985 | Shaw et al. ....................... | 350/96.15 |
| 4,565,593 | 1/1986 | Marr ....................................... | 156/64 |
| 4,649,670 | 3/1987 | Snyder .............................. | 51/284 R |

FOREIGN PATENT DOCUMENTS 2150472  7/1985  United Kingdom ............. 51/281 R

Primary Examiner—Charlie T. Moon
Attorney, Agent, or Firm—Riches, McKenzie & Herbert

[57] ABSTRACT

A process for the production of polished block single mode, evanescent wave directional optical couplers. The process comprises producing a plurality of discrete coupler halves, each coupler half having an optical fiber imbedded in a substrate. The coupler halves are then ground to remove a small portion of the cladding of the optical fiber to produce an oval shaped area of defined dimensions of the exposed fiber. The ground coupler halves are mounted in a first holder in a coplaner manner and further worked to a end point determined by an evanescent coupling measurement. A pair of coupler halves are secured together such that the optical fibers are in optical contact and in effective fusion with each other.

20 Claims, 6 Drawing Figures

METHOD OF PRODUCING POLISHED BLOCK TYPE, SINGLE MODE, EVANSCENT WAVE DIRECTIONAL COUPLERS BY MEANS OF MASS PRODUCTION OF THE COUPLER HALVES

RELATED APPLICATIONS

This application is related to my U.S. patent application Ser. No. 700,281 filed on Feb. 11, 1985, the disclosure of which is herein incorporated by reference.

BACKGROUND OF THE INVENTION

1. Field of the Invention

This invention relates generally to optical couplers and more particularly, to a new method of producing polished block type, single mode, evanescent wave directional couplers by means of mass production of the coupler halves.

2. Description of the Prior Art

Optical couplers are well known and various methods have been proposed to produce and assemble such couplers, especially single mode evanescent wave directional couplers.

In my prior U.S. patent application Ser. No. 700,281 filed on Feb. 11, 1985, the disclosure of which is incorporated herein by reference, there is disclosed an evanescent wave coupler having the important feature that in the coupler halves of which the assembled coupler is made, the fiber surface is positioned above or proud of the surface of the supporting substrate to enable fiber to fiber contact such that evanescent wave coupling occurs without the need for any interleaving material such as index matching oils and the assembly of the coupler is made simple as large surface areas are not required to be perfectly clean.

In the aforenoted patent application, there is disclosed a method of manufacture which illustrates the importance of the substrate hardness and the physical properties of the polishing lap which are the significant parameters in production of the coupler half having a proud fiber. However that method of manufacture was designed to produce coupler halves one at a time or as sets of coupler halves in a common substrate.

Another method has been proposed by Jaccard et al as reported in ECOC 83-9th European Conference on Optical Communications, Elsevier Science Publishers B.V. (North Holland), 1983, pp 409 to 412. The principle of the technique of Jaccard et al is based on the transfer of the in-plane submission accuracy provided by photolithography and anisotropic etching on silicon onto the mechanical etching of a collection of fibers via the preservation of the flatness of a polished side of a silicon wafer which is taken as a reference plane and used as a precise polishing stopper.

In the disclosed methods using a common substrate, there exists a need for great precision in the making of the grooves that support the fiber and also in the fixing of the fiber within the grooves in order that all of the coupler halves are identical. Further, it is necessary that the fiber core is well centered within the cladding and that there is no movement of the fiber with age within the groove for the above reason.

SUMMARY OF THE INVENTION

Accordingly, it is an object of the present invention to at least partially overcome these disadvantages by providing a method of producing coupler halves used to make single mode evanescent wave directional optical couplers which method does not require the need for such precision.

It is a further object of the present invention to provide a novel method of producing coupler halves used to make single mode evanescent wave directional optical couplers in a multiple or batch process which overcomes the need for such precision yet involves a relatively simple process.

It is yet a further objection of the present invention to produce a single mode evanescent wave directional optical coupler using a coupler half produced in a multiple or batch process.

To this end, in one of its aspects, the invention provides a process for the production of polished block, single mode, evanescent wave directional optical couplers which comprises producing a plurality of discrete coupler halves, each coupler half having an optical fiber imbedded in a substrate grinding said coupler halves to remove a small portion of the cladding of the optical fiber to produce an oval shaped area of defined dimensions of the exposed fiber, mounting said ground coupler halves in a first holder in a coplaner manner, further working said coupler halves to an end point determined by an evanescent coupling measurement, and securing a pair of coupler halves together such that the optical fibers are in optical contact and are in effective fusion with each other.

In yet another of its aspects, the invention provides a process for the production of polished block, single mode, evanescent wave directional optical couplers which comprises producing a plurality of discrete coupler halves, each coupler half having a single mode optical fiber embedded in a glass substrate, grinding said coupler halves by sequential timed grinding periods to remove a small portion of the cladding of the optical fiber to produce an oval shaped area of defined dimensions of the exposed fiber, sorting said coupler halves according to the width of said oval shaped area, mounting a plurality of coupler halves all having a width of said oval shaped area with a defined range, fiber side down, on a surface of a flat plate in intimate contact therewith, packing a plurality of packing pieces around said coupler halves forming a marginally circular arrangement, stripping away any foreign material from the surface of said coupler halves simultaneously with mounting said coupler halves on said flat plate, fixing a first holder to the back of said coupler halves, removing said flat plate and mounting said coupler halves on a second support, removing the cladding of the optical fiber to a distance of about 5 to 20 microns to the core of the fiber, polishing said coupler halves until the fibers are proud of the substrates and the substrates are essentially flat with small turned off edges, testing the coupler halves to determine the end point of the process, by an evanescent coupling measurement, and securing a pair of coupler halves together such that the optical fibers are in optical contact and are in effective fusion with each other.

In summary, the invention provides a novel process wherein coupler halves are first prepared, preferably in rectangular substrate shapes, with fiber ends of the order of about one meter length, commonly referred to as pigtails. The substrates are then ground until an oval shape which is the flat surface of the exposed fiber is observed. The coupler halves are then sorted according to the width of this oval shaped area and temporarily stored in narrow size range groups until enough of each desired group have been accumulated to assemble into a single first holder for the next step in the process.

If there is observed a large scatter in the size ranges, then some small effort in hand grinding of a few of the substrates, will result in a very significant reduction in the range of the widths. In this way, the precision previously required for the depth of the groove in the substrate and the fixing of the fiber in the groove has been eliminated.

The next step involves the assembly of a group of the coupler halves in a row, with the fiber side down, on a flat surface. Preferrably, they are then surrounded by a plurality of packing pieces such that a nominally circular arrangement is produced which is the optimum arrangement for the grinding and polishing stages.

A first holder is fixed to the back of the substrates (coupler halves) and the packing pieces without disturbing the flat surface. The assembly is then slid off the flat surface and mounted on a second (layer) holder that supports the plurality of fiber pigtails. The assembly is then ground until the surfaces of the fibers are at the desired distance from the core. This distance is dependent on the structure of the fiber, and is typically from about 5 to about 20 microns.

The assembly is then polished and tested to determine the end point of the process. This testing may be done by several means. One such means is to illuminate an oil film which is applied to the surface of an individual coupler half. Any light which is evanescently coupled into that half is then detected. There is considerable time saved in testing as the illuminating source is a permanent device composed, in one embodiment, of a multimode fiber having an exposed core which readily leaks out light in contact with an oil of a higher index than its own core. Thus, the introduction of laser light into each individual pigtail is eliminated. Detection of light from the output pigtail is a relatively quick operation.

Some calibration test runs may be needed to establish the light levels that are detected compared to the degree of the depth of polishing of the coupler halves. As each coupler half reaches its end point, it is removed from the assembly and the remainder are processed. In this way, the centering of the core within the cladding and any short term drift of the fiber in the groove is eliminated. The end point is reached for several coupler halves simultaneously depending upon the accuracy of all of the steps in the process and the tolerance in the depth to which polishing is required.

In some cases, the state of the art allows all the coupler halves in the assembly to be finished simultaneously and only a sample of the individual couplers are tested.

Further objects of the invention will be apparent from the following description taken in conjunction with the following drawings.

DESCRIPTION OF THE PREFERRED EMBODIMENT

Figure 1:
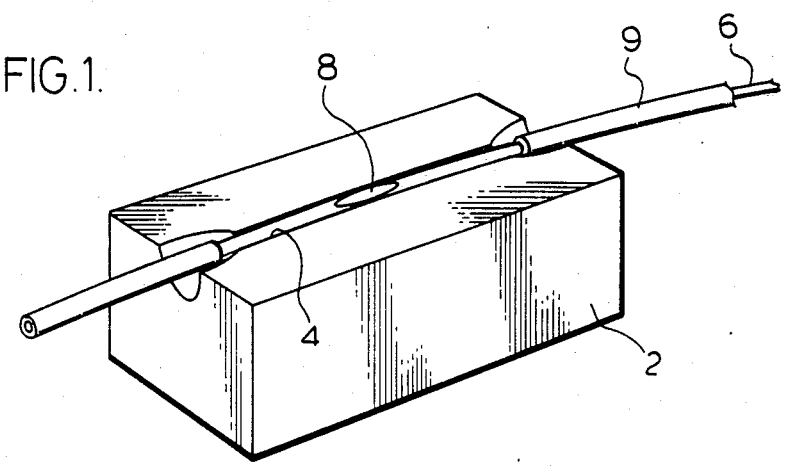
FIG. 1 is a perspective view of a coupler half used to produce a single mode evanescent wave directional optical coupler, in accordance with the method of the present invention.

Reference is first made to FIG. 1 which shows a generally rectangular substrate 2 which may preferably be made of pyrex, having a longitudinal groove 4 cut therein. The substrate 2 supports a single mode optical fiber 6. The optical fiber 6 has been ground to expose an oval shaped area 8 of the cladding 6.

The grinding of the substrate 2 is conveniently done by successive timed grinding periods on a flat tool by any of the commonly available lapping machines, until the oval shaped area 8 is observed. The width of the oval shaped area 8 is then measured and the partially ground coupler half is temporarily stored. This width and the known diameter of the fiber 6 are used to determine the distance of the ground oval shaped area 8 from the core of the fiber.

One method for producing the groove 4, mounting the fiber 6 therein, and measuring the oval shaped area 8, has been disclosed in my prior U.S. patent application Ser. No. 700,281, which is incorporated herein by reference.

Figure 2:
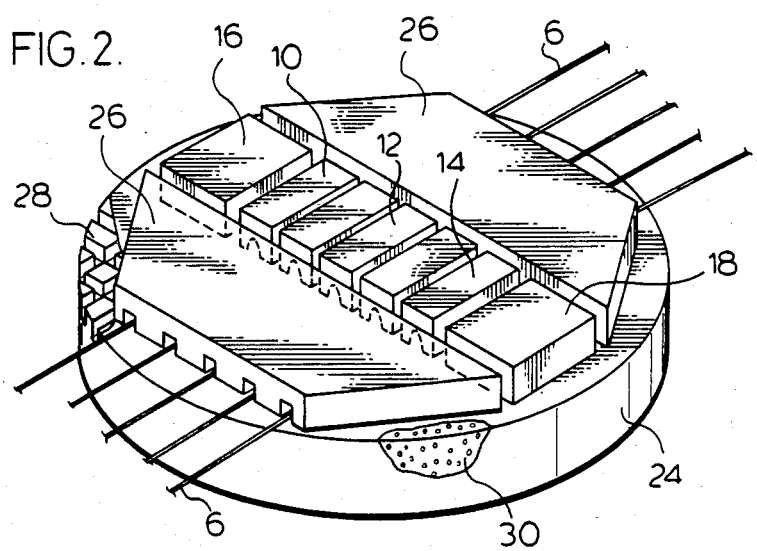
FIG. 2 is a perspective view of a plurality of coupler halves of FIG. 1 and packing pieces supported on a flat surface.

Referring now to FIG. 2, the individual partially ground coupler halves 10, 12, 14 are placed fiber side down in a row on flat plate 24. Packing pieces 26 are packed around the coupler halves 10, 12, 14 to produce a nominally circular arrangement. The coupler halves 10, 12, 14 are rubbed on the surface of the flat plate 24 to obtain intimate contact therewith.

In order to improve the contact between the coupler halves 10, 12, 14 with the flat plate 24, the plate 24 preferably carries a plurality of small slots 28 which will strip away any foreign material which might impede the contact. An alternate method (also shown in FIG. 2) is for plate 24 to be a porous plate, a section of which is referred as numeral 30. With this embodiment, the holes of the porous plate 30 allows for both the stripping of any foreign material and also for the introduction of a vacuum (not shown) from the back of the plate 24 to hold the coupler halves in place. An alternate method for holding the coupler halves 10, 12, 14 in place is to place a very thin film of viscous oil between the coupler halves 10, 12, 14 and the surface of the plate 24.

Figure 3:
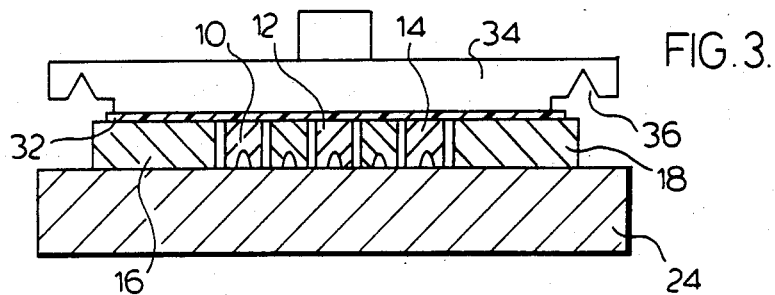
FIG. 3 is a side elevational view of an assembly of coupler halves supported on a flat surface.
Figure 4:
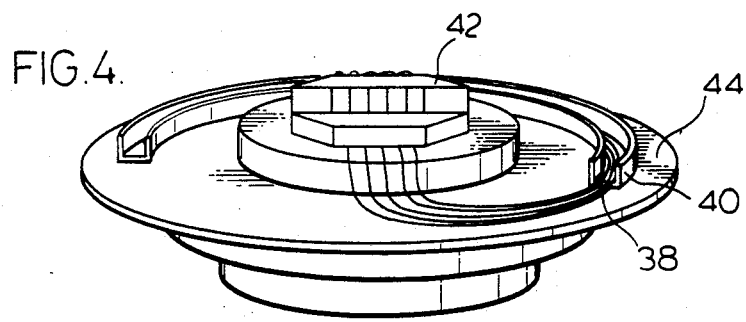
FIG. 4 is a perspective view of the assembly of FIG. 3 supported on a large holder prior to grinding.

Referring now to FIG. 3, a first holder 34 which can be attached to a vertical spindle (not shown) for grinding and polishing optical surfaces, is fixed to the back of the coupler halves 10, 12, 14 and the packing pieces 16, 18 by means of a thin, thermoplastic film 32. The film 32 may be composed of traditional materials such as fairly hard optical pitches or resinous wax material. The self annealing properties of pitch are excellent for producing a strain free coplaner assembly of coupler halves but care is needed in the subsequent operations to prevent viscous flow caused by large forces which tend to produce uneven optical working as well as distance measurement errors. The first holder 34 has kinematic mounts 36 which are the foot rest positions for a depth measurement instrument which is used to determine the amount of material removed from the assembly in subsequent processes.

The assembly is then slid off the flat plate 24, and the first holder 34 and the half coupler assembly generally indicated as 42, are then supported on a second holder 44 which uses mounts 40 to secure the fiber pigtails 38. A flat grinding tool (not shown) is then used in the usual way to remove the cladding on the fibers until the desired thickness above the core of the fiber is reached. Such thickness is predetermined from considerations of fiber types, and the amount of material to be removed by polishing. As highly stressed fibers such as the polarisation preserving type tend to have deeper stress cracks than other fibers, more polishing is needed to obtain low scatter levels.

The pitch receipe described in my copending application Ser. No. 700,281 is used to polish the assembly such that the fibers are proud of the substrates and the substrates are essentially flat with small turned off edges.

Figure 5:
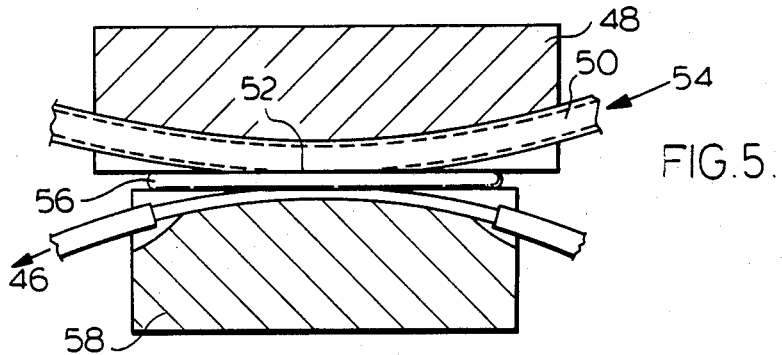
FIG. 5 is a side view of a multimode half coupler connected by an oil film to a single mode coupler half.

Reference is now made to FIG. 5 which shows a multimode fiber 50 which is supported in a substrate 48 which has been polished to remove a substantial part of the large diameter core, thus producing the face 52. This device is then illuminated with laser light 54 and the light is then emitted from the face 52 when it is in contact with a high index oil 56. Half couplers 58 which have a photodetector at the fiber end 46, capture the light from the oil layer by evanescent wave coupling. The light intensity is a measure of the condition that a pair of coupler halves will have to make a coupler of a given coupling ratio. Some experimental tests with a particular oil may be required to establish the intensity for any particular coupling ratio and a standard half coupler is kept for oil source intensity checks.

When the test indicates that the coupler halves have reached the end point of the process, the coupler halves are removed by a pair of thin jaw pliers in a careful manner such that the remainder of the coupler halves and the packing pieces are not disturbed. Careful selection of oval sizes within a narrow range and of small size with respect to the fiber diameter as well as thin supporting pitch layer, tends to bring a majority of the coupler halves to the end point simultaneously.

Having formed coupler halves of the desired specifications, the coupler halves may be joined together to form the desired coupler. For example, a simple alignment jig which allows the coupler halves to be positioned with respect to each other using differential micrometers may be used to set coupling ratios with 1% accuracy.

The coupler halves may be joined together using a resin cement of low viscosity. The two coupler halves are maintained under pressure such that the fiber to fiber contact is under compression and a very small elastic deformation of the fiber maintains contact over a few mms of surface. After curing, the elastic deformation is preserved in the coupler halves which maintains the optical contact under a range of temperature conditions. An overall coating of a resin may be used to seal the coupler.

Figure 6:
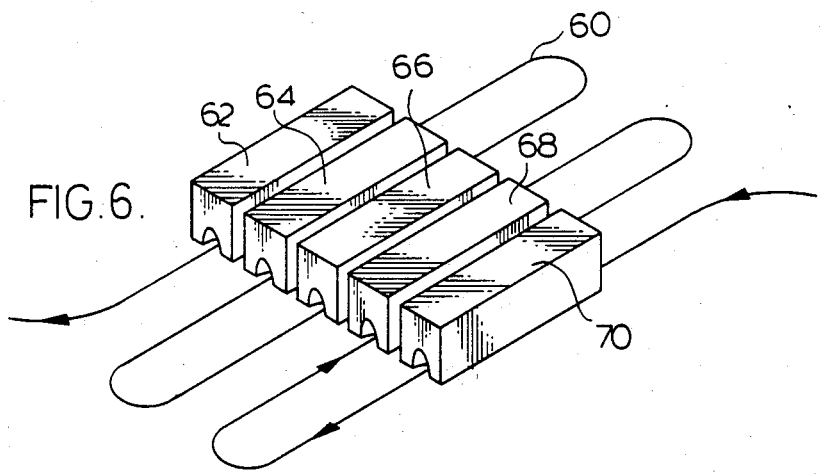
FIG. 6 is a perspective view of a plurality of coupler halves on a single strand of fiber.

Fiber devices that have a number of couplers joined together to form an interferometer or some communications device require splices. As splices have inherent losses, the elimination of the splices represents a major step in the improvement of these devices. A further embodiment of the method of manufacture of such couplers is illustrated in FIG. 6. In FIG. 6, a plurality of coupler halves 62, 64, 66, 68, 70 are shown on the same fiber 60. In the preparation of the coupler halves, in the individual grinding stage that exposes the cladding to form the oval shaped area, each coupler half is carefully ground will successive reduction of grinding time to obtain oval shaped area widths of the same size. The coupler half that has initially the widest oval is taken as the target. The process then continues to the end point.

While the foregoing disclosure illustrates and described a preferred embodiment of the invention, it is to be understood that it is not so restricted.

What I claim is:

1. A process for the production of polished block, single mode, evanescent wave directional optical couplers which comprises producing a plurality of discrete coupler halves, each coupler half having an optical fiber imbedded in a substrate, grinding said coupler halves to remove a small portion of the cladding of the optical fiber to produce an oval shaped area of defined dimensions of the exposed fiber, mounting said ground coupler halves in a first holder in a coplaner manner, further working said coupler halves to an end point determined by an evanescent coupling measurement, and securing a pair of coupler halves together such that the optical fibers are in optical contact and in effective fusion with each other.

2. A process as claimed in claim 1 wherein said substrate is a glass block.

3. A process as claimed in claim 1 wherein said optical fiber is a single mode optical fiber.

4. A process as claimed in claim 1 wherein said coupler halves are ground by successive timed grinding periods.

5. A process as claimed in claim 1 wherein subsequent to grinding, the coupler halves are sorted according to the width of said oval shaped area.

6. A process as claimed in claim 5 wherein all of said coupler halves mounted in said first holder all have a width of said oval shaped area within a defined range.

7. A process as claimed in claim 6 wherein said coupler halves are first mounted, fiber side down, on a surface of a flat plate in intimate contact therewith and a plurality of packing pieces are packed around said coupler halves.

8. A process as claimed in claim 7 wherein said coupler halves and said packing pieces form a nominally circular arrangement.

9. A process as claimed in claim 7 further including the step of stripping away any foreign material from the surface of said coupler halves simultaneously with mounting said coupler halves on said flat plate.

10. A process as claimed in claim 7 wherein a very thin film of viscous oil is placed between said coupler halves and said flat plate.

11. A process as claimed in claim 1 wherein said first holder is fixed to the back of said coupler halves.

12. A process as claimed in claim 1 wherein said first holder is fixed to the back of said coupler halves by means of a thin, thermoplastic film.

13. A process as claimed in claim 12 wherein said film is a hard optical pitch or resinous wax material.

14. A process as claimed in claim 7 wherein said further working includes the steps of removing said flat plate mounting said coupler halves on a second support, removing the cladding of the optical fiber until the desired thickness above the core of the fiber is reached, polishing said coupler halves until the fibers are proud of the substrates and the substrates are essentially flat with small turned off edges, testing the coupler halves to determine the end point of the process.

15. A process as claimed in claim 14 wherein the cladding is removed to a distance of about 5 to about 20 microns from the core of the fiber.

16. A process as claimed in claim 14 wherein said testing comprises applying an oil film to the surface of one of said coupler halves, illuminating said oil film and detecting any light which is evanescently coupled into said coupler half.

17. A process as claimed in claim 16 wherein said oil film is illuminated by a multimode fiber having an exposed core that readily leaks out light in contact with an oil of higher index that its core.

18. A process as claimed in claim 1 wherein a single optical fiber is used for a plurality of coupler halves.

19. A process for the production of polished block, single mode, evanescent wave directional optical couplers which comprises producing a plurality of discrete coupler halves, each coupler half having a single mode optical fiber embedded in a glass substrate, grinding said coupler halves by successive timed grinding periods to remove a small portion of the cladding of the optical fiber to produce an oval shaped area of defined dimensions of the exposed fiber, sorting said coupler halves according to the width of said oval shaped area, mounting a plurality of coupler halves all having a width of said oval shaped area with a defined range, fiber side down, on a surface of a flat plate in intimate contact therewith, packing a plurality of packing pieces around said coupler halves forming a nominally circular arrangement, stripping away any foreign material from the surface of said coupler halves simultaneously with mounting said coupler halves on said flat plate, fixing a first holder to the back of said coupler halves, removing said flat plate and mounting said coupler halves on a second support, removing the cladding of the optical fiber to a distance of about 5 to about 20 microns to the core of the fiber, polishing said coupler halves until the fibers are proud of the substrates and the substrates are essentially flat with small turned off edges, testing the coupler halves to determine the end part of the process, by an evanescent coupling measurement, and securing a pair of coupler halves together such that the optical fibers are in optical contact and are in effective fusion with each other.

20. A process for the production of polished block, single mode, evanescent wave directional optical couplers which comprises producing a plurality of discrete coupler halves, each coupler half having a single mode and continuous optical fiber embedded in a glass substrate, grinding said coupler halves by successive timed grinding periods to remove a small portion of the cladding of the optical fiber to produce an oval shaped area of defined dimensions of the exposed fiber, mounting a plurality of coupler halves all having a width of said oval shaped area, fiber side down, on a surface of a flat plate in intimate contact therewith, packing a plurality of packing pieces around said coupler halves forming a nominally circular arrangement, stripping away any foreign material from the surface of said coupler halves simultaneously with mounting said coupler halves on said flat plate, fixing a first holder to the back of said coupler halves, removing said flat plate and mounting said coupler halves on a second support, removing the cladding of the optical fiber to a distance of about 5 to about 20 microns to the core of the fiber, polishing said coupler halves until the fibers are proud of the substrates and the substrates are essentially flat with small turned off edges, testing the coupler halves to determine the end point of the process, by an evanescent coupling measurement, and securing a pair of coupler halves together such that the optical fibers are in optical contact and are in effective fusion with each other.

* * * * *